E. JONES.
Harvester.
No. 1,744. Reissued Aug. 23, 1864.
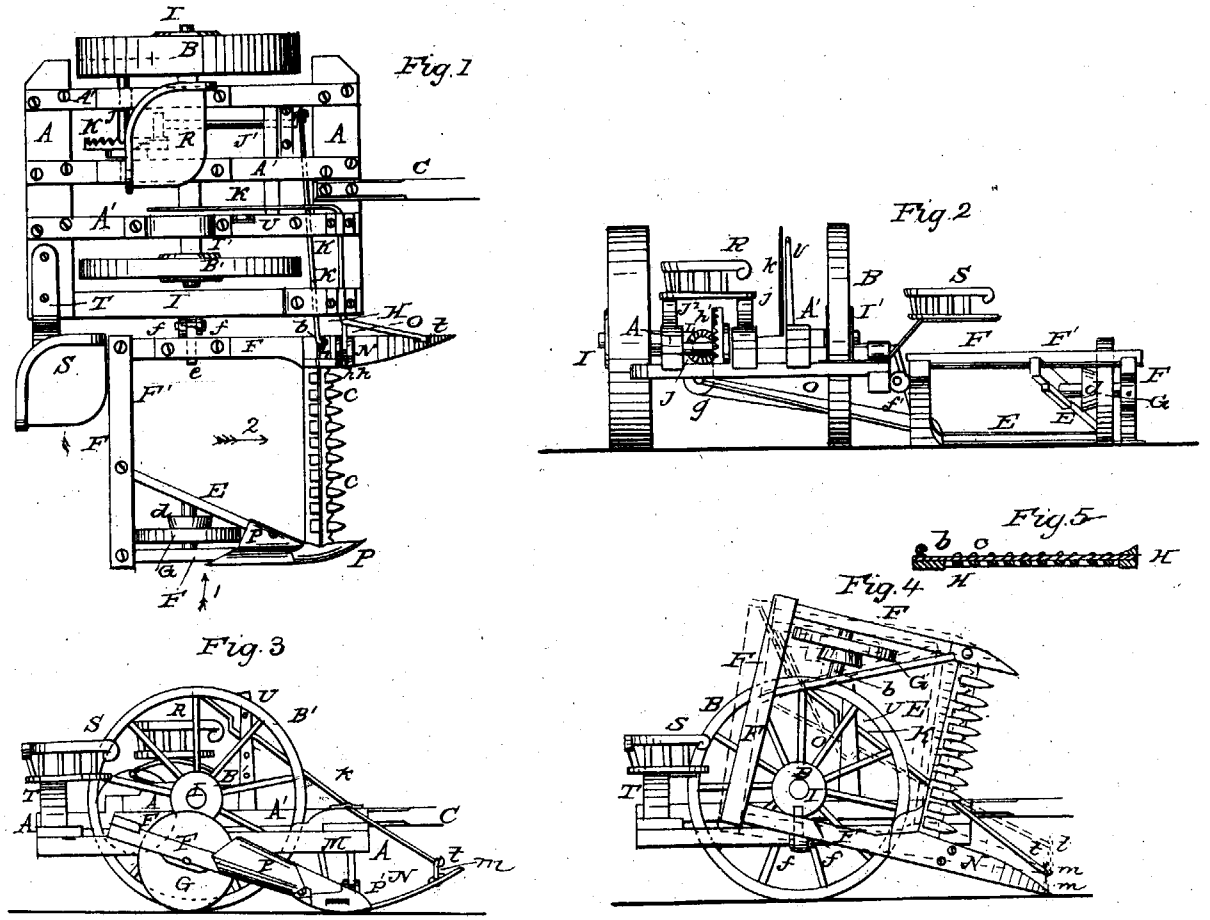
WITNESSES
John P. Jacobs
D. Dana Dodge
INVENTOR
Edwin Jones
by his atty
Thos. H. Dodge
N. PETERS, Photo-Lithographer, Washington, D. C.

UNITED STATES PATENT OFFICE.

EDWIN JONES, OF CHESTER CROSS ROADS, OHIO.

IMPROVEMENT IN HARVESTERS.

Specification forming part of Letters Patent No. 27,636, dated March 27, 1860; Reissue No. 1,744, dated August 23, 1864.

DIVISION No. 2.

*To all whom it may concern:*

Be it known that I, EDWIN JONES, of Chester Cross Roads, in the county of Geauga and State of Ohio, have invented certain new and useful Improvements in Combined Reaper and Mower, of which the following is a full, clear, and exact description, reference being had to the accompanying drawings, which form a part of this specification, and in which—

Figure 1 represents a plan or top view of the machine with the grain-platform removed for mowing. Fig. 2 represents a rear view of the same. Fig. 3 represents a side view, looking in the direction of arrow 1, Fig. 1. Fig. 4 represents a similar view with the finger-beam raised or folded up for transportation or storage, the finger-beam being shown in two different positions—one in black and the other in red lines—to illustrate the mode of folding the finger-beam for transportation by aid of a lifting-lever and chain or cord. Fig. 5 represents a section of the finger and cutter bar on line *x x*, Fig. 1, looking in the direction of arrow 2, Fig. 1, only so much of the parts being shown as is necessary to illustrate the cutter-bar in combination with the machine at the heel of the finger bar or beam.

The nature of the invention consists in the combination, with the main frame of a mowing-machine, of a single right-angled lever and a seat for the driver, in such a manner as that the driver, from his seat on the machine, can grasp the rear elevated end of said lever, and by simply drawing it back can cause the finger-beam and cutters to be raised by the front end of said lever to pass over cut grass and other obstructions, as a stone or stump, without raising the front of the main frame; and the nature of the invention further consists in connecting the front end of said lever to the front elevated end of the shoe which supports the heel of the finger-beam by a flexible connection arranged to work up and down in front or in advance of the inner front corner of the main frame; and the nature of the invention further consists in so combining the supports of the finger-beam and the connection of the shoe and the front end of the lever by which the cutting apparatus is raised as that one of the supports of the finger-beam will be in rear of said connection and the shoe which supports the heel of the finger-beam, and on a line, or nearly so, with a vertical plane passing through the axis of the main supporting-wheels, while the other will be at or near the front outer corner of the main frame, thus enabling all of the parts to be raised with ease and convenience.

The nature of the invention further consists in the combination, with the main frame of a mowing-machine, of a finger-beam for supporting the cutter having two connections or supports, one of which is formed by a connection extending from the shoe, which supports the heel of the finger-beam on a line at right angles, or nearly so, to the line of motion of the machine, and is connected with the front outer corner of the main frame, while the other extends back and in rear of said shoe on a line parallel, or nearly so, to the line of motion of the machine, and is supported on the outside of the main frame at a point nearly on a line with a vertical plane passing through the main supporting-wheels, both of said supports or connections being such that as the machine passes over the ground the finger-beam will have sufficient freedom to conform to irregularities in the same.

In the accompanying drawings, A A A′ A′ A′ represent the main frame of a mowing-machine supported by two wheels, B B′, which turn loosely on stationary journals I I′ made fast to the main frame.

C is the tongue by which the machine is drawn.

The finger-beam E is attached to the front of frame F, the heel end being also connected with shoe N, which projects in front, like a runner, as indicated in the drawings. The finger-beam is supported at the side of the machine and rests on the ground when in operation. Frame F is supported by wheel G and swivel-piece *e*, hinged to ears or lugs *f f*, projecting from the side of piece M, attached to the main frame, whereby the finger-beam and cutter can rise and fall to conform to irregularities in the ground, the axis of wheel G and the swivel *e* being the points of oscillation.

As the machine advances motion is communicated to cutter-bar H by pitman D, crank *a*, shaft J′, gears L K, shaft J from wheel B, which has teeth or cogs on the inner face of its inner projecting rim, said cogs or teeth taking into cogs on a wheel on the projecting end of shaft J. (See dotted lines in Fig. 1, which show the position of the gear on the end of shaft J.)

R is the driver's, and S the raker's seat, the latter being used when the machine is used to reap grain, in which case a platform is to be placed on frame F, and a reel properly supported to sweep the grain back and hold it to the action of the cutters, which work through slotted fingers *c*.

Shoe N is provided with two ears or lugs, between which the right end of a coupling-arm, O, is hinged, the other end of the coupling-arm being hinged to a bracket or hanger, *g*, made fast to the under side of the main frame.

On top of the frame is supported a bent lever, *k*, which turns in bearings *k′ k′*. This lever is for the purpose of raising and lowering the finger-beam by means of a cord or chain, *m*, fastened to its front end, *t*, and to the point of shoe N. When the driver wishes to raise the finger-beam he depresses the rear end of lever *k*, which causes the front end, *t*, thereof to be turned up, thus raising the coupling-arm and finger-beam and the front of frame F, and if before lifting the right end of the coupling and the finger-beam the latter is turned up on end against the side of the machine, as shown in black lines, Fig. 4, then when the lever is depressed and the point *t* raised or turned up, lifting with it the right end of the coupling-arm and shoe N, suspended to it, the finger-beam will be raised bodily upward, leaning against the machine until it assumes the position shown in red lines, Fig. 4, where it can be fastened to standard *v* by a rope or chain, *o*, if desired.

Lever *k* can be held in any desired position by pins or a catch placed in holes in the same standard. When in this position the machine can be drawn about through gates and over fields with as much ease as a common cart.

To unfold the finger-beam is alike easy, and can be effected by a single person or attendant—viz., by taking hold of the lever *k* and allowing the heel of the finger-beam to descend and rest on the ground, as shown in black lines, Fig. 4, and then taking hold of the other end of the finger-beam and laying it down upon the ground in the position shown in Fig. 1.

For a more full description of the various parts of the machine reference can be had to other patented divisions of even date herewith.

In folding up the finger-beam to the side of the main frame the operation may be effected with equal facility by raising first the front end of the finger-beam by means of the lever *k*, and by then folding it up to the side of the main frame, in which case it will arrive directly to the position represented in red lines in Fig. 4, the attachment of the finger-beam and frame F to the main frame being such that they can readily be folded up, whether the front of the finger-beam be raised or not.

Having described one mode of applying the improvements to use, what I claim under this patent is—

1. Connecting the front end of the right-angled lever *k* to the front elevated end of the shoe which supports the heel of the finger-beam by a flexible connection arranged to work up and down in front or advance of the front inner corner of the main frame, when there is ample room, without interfering with the frame or other working parts of the machine.

2. In a mowing-machine having the finger-beam arranged so as to give a "front-side cut," as it is generally called, combining the supports of the finger-beam and the connection of the shoe with the front end of the lever by which the cutting apparatus is raised, substantially as described, so that one of the supports of the finger-beam will be in rear of said lifting-cord and the shoe which supports the heel of the finger-beam, and on a line, or nearly so, with a vertical plane passing through the axis of the main supporting-wheels, while the other is at or near the front outer corner of the main frame, thus enabling the heel of the finger-beam to be raised by power applied at or near the angle formed by its extending supports.

3. In a mowing-machine, supporting the finger-beam to which the guard-fingers are attached by two supports, one of which is at or near the front outer corner of the main frame, while the other supporting device is connected to and extends back from the shoe which supports the heel of the finger-beam, on a line at right angles, or nearly so, to the first connection or extension piece, and is supported outside of the main frame at a point nearly on a line with a vertical plane passing through the main supporting-wheels, both connections being such as to allow the fingers to rise and fall to pass over irregularities in the ground without raising the front of the main frame in the same proportion.

In witness whereof I have hereunto subscribed my name.

EDWIN JONES.

In presence of—
JAMES P. STEPHENSON,
JOEL D. JONES.